(12) United States Patent
Fryshman

(10) Patent No.: US 10,292,408 B2
(45) Date of Patent: May 21, 2019

(54) INDUCTION COOKING APPARATUS AND METHOD OF USE

(71) Applicant: Bernard Fryshman, Brooklyn, NY (US)

(72) Inventor: Bernard Fryshman, Brooklyn, NY (US)

(*) Notice: Subject to any disclaimer, the term of this patent is extended or adjusted under 35 U.S.C. 154(b) by 0 days.

(21) Appl. No.: 15/865,336

(22) Filed: Jan. 9, 2018

(65) Prior Publication Data

US 2018/0125103 A1 May 10, 2018

Related U.S. Application Data

(60) Continuation of application No. 14/840,194, filed on Aug. 31, 2015, now Pat. No. 9,867,389, which is a division of application No. 13/372,654, filed on Feb. 14, 2012, now Pat. No. 9,131,536.

(60) Provisional application No. 61/442,369, filed on Feb. 14, 2011.

(51) Int. Cl.
| H05B 6/12 | (2006.01) |
| C23C 14/22 | (2006.01) |
| F24C 15/16 | (2006.01) |
| A23L 5/10 | (2016.01) |
| H05B 6/02 | (2006.01) |

(Continued)

(52) U.S. Cl.
CPC .............. *A23L 5/15* (2016.08); *H05B 6/02* (2013.01); *H05B 6/04* (2013.01); *H05B 6/105* (2013.01); *H05B 6/12* (2013.01); *Y10T 29/49021* (2015.01)

(58) Field of Classification Search
CPC . H05B 6/105; H05B 6/12; H05B 6/02; H05B 6/04; A47J 36/16; A47J 36/04; A47J 36/02; Y10T 29/49119; Y10T 29/49021; A23L 5/15; A23L 1/0128
USPC ........ 219/620–627, 661–668, 386, 398, 518, 219/672, 393; 99/DIG. 14, 325–334, 340, 99/451, 385, 393; 126/337 A, 90 A, 246, 126/375.1, 337 R, 339; 427/248.1, 250, 427/345, 561, 569, 570, 576
See application file for complete search history.

(56) References Cited

U.S. PATENT DOCUMENTS

| 3,138,698 A | 6/1964 | Wells et al. |
| 3,221,638 A * | 12/1965 | Wickenberg ......... A47J 37/043 99/340 |
| 3,494,722 A | 2/1970 | Gray |

(Continued)

FOREIGN PATENT DOCUMENTS

| CN | 205953976 | 2/2017 |
| JP | 07275578 A * | 10/1995 |

(Continued)

OTHER PUBLICATIONS

Non-Final Office Action on U.S. Appl. No. 15/383,024 dated Feb. 23, 2018.

(Continued)

*Primary Examiner* — Quang T Van
(74) *Attorney, Agent, or Firm* — Foley & Lardner LLP

(57) ABSTRACT

A cooking apparatus includes a cooking vessel, a support structure, an assortment of ferrous members and a source of electro-magnetic radiation. The ferrous members are mounted on the support structure along with food. The source of electro-magnetic radiation heats the ferrous members and enables a previously unobtainable level of precision and control in the preparation of food.

20 Claims, 5 Drawing Sheets

(51) Int. Cl.
*H05B 6/10* (2006.01)
*H05B 6/04* (2006.01)

(56) References Cited

U.S. PATENT DOCUMENTS

| | | |
|---|---|---|
| 3,745,290 A | 7/1973 | Harnden et al. |
| 3,790,735 A | 2/1974 | Peters, Jr. |
| 4,020,310 A | 4/1977 | Souder et al. |
| 4,418,259 A | 11/1983 | Lewis |
| 4,766,879 A | 8/1988 | Freese |
| 4,776,386 A | 10/1988 | Meier |
| 4,999,467 A | 3/1991 | Iguchi |
| 5,053,593 A | 10/1991 | Iguchi |
| 5,366,764 A | 11/1994 | Sunthankar |
| 5,466,915 A | 11/1995 | Meier et al. |
| 5,508,498 A | 4/1996 | Rheinish et al. |
| 5,628,241 A | 5/1997 | Chavanaz et al. |
| 5,665,258 A * | 9/1997 | Hsu ............... A47J 37/043 219/386 |
| 5,665,263 A | 9/1997 | Gaspard |
| 5,821,507 A | 10/1998 | Sasaki et al. |
| 5,979,673 A | 11/1999 | Dooley |
| 6,700,183 B2 | 3/2004 | Jiang |
| 6,758,131 B1 | 7/2004 | Joubert |
| 6,864,468 B2 | 3/2005 | Kim et al. |
| 7,170,037 B2 | 1/2007 | Walter |
| 8,803,045 B2 | 8/2014 | Cadima |
| 9,820,690 B1 | 11/2017 | Schwartz et al. |
| 2001/0035406 A1 | 11/2001 | Ryan et al. |
| 2005/0065545 A1 | 3/2005 | Wallace |
| 2007/0000915 A1 | 1/2007 | Cheng |
| 2007/0023486 A1 | 2/2007 | Matsuura et al. |
| 2010/0000980 A1 | 1/2010 | Popescu |
| 2010/0155391 A1 | 6/2010 | Koschberg et al. |
| 2010/0170892 A1 | 7/2010 | Wilson et al. |
| 2013/0153565 A1 | 6/2013 | Fryshman |
| 2014/0042170 A1 | 2/2014 | Correa |
| 2014/0165607 A1 | 6/2014 | Alexander |
| 2014/0217090 A1 | 8/2014 | Fryshman |
| 2014/0238383 A1 | 8/2014 | Armstrong |
| 2015/0126964 A1 | 5/2015 | Martel et al. |
| 2016/0311542 A1 | 10/2016 | Mackin |
| 2016/0370322 A1 | 12/2016 | Hull et al. |

FOREIGN PATENT DOCUMENTS

| | | |
|---|---|---|
| JP | 2006-172727 | 6/2006 |
| WO | WO-2010/002751 | 1/2010 |

OTHER PUBLICATIONS

Ex Parte Quayle Action on U.S. Appl. No. 14/798,060 mailed Jun. 9, 2017.
Ex Parte Quayle Action on U.S. Appl. No. 15/457,207 mailed Dec. 20, 2017.
Final Office Action received for U.S. Appl. No. 13/372,654 dated May 12, 2015.
International Preliminary Report on Patentability issued on PCT/US2016/041871, dated Jan. 16, 2018.
International Search Report and Written Opinion issued on PCT/US2016/041871, dated Nov. 16, 2016.
International Search Report and Written Opinion issued on PCT/US23017/020103, dated May 23, 2017.
Non-Final Office Action on U.S. Appl. No. 13/372,654, dated Jan. 26, 2015.
Non-Final Office Action on U.S. Appl. No. 14/078,297, dated Mar. 24, 2015.
Non-Final Office Action on U.S. Appl. No. 14/798,060 dated Jan. 3, 2017.
Non-Final Office Action on U.S. Appl. No. 14/798,060 dated Jun. 22, 2016.
Non-Final Office Action on U.S. Appl. No. 15/207,567 dated Dec. 18, 2017.
Non-Final Office Action on U.S. Appl. No. 15/422,585 dated Nov. 30, 2017.
Non-Final Office Action on U.S. Appl. No. 15/491,630 dated Feb. 2, 2018.
Notice of Allowance on U.S. Appl. No. 13/372,654, dated Jul. 8, 2015.
Notice of Allowance on U.S. Appl. No. 14/796,071 dated Nov. 8, 2016.
Notice of Allowance on U.S. Appl. No. 14/078,297, dated May 18, 2015.
Notice of Allowance on U.S. Appl. No. 14/840,194 dated Sep. 13, 2017.
U.S. Notice of Allowance on U.S. Appl. No. 14/798,060 dated Oct. 2, 2017.
Final Office Action on U.S. Appl. No. 15/422,585 dated Apr. 19, 2018.
Non-Final Office Action on U.S. Appl. No. 15/457,207 dated Apr. 12, 2018.

* cited by examiner

INDUCTION COOKING APPARATUS AND METHOD OF USE

CROSS-REFERENCE TO RELATED PATENT APPLICATIONS

This application is a continuation of U.S. application Ser. No. 14/840,194, filed on Aug. 31, 2015, which in turn is a divisional application of U.S. application Ser. No. 13/372,654, filed on Feb. 14, 2012 (now U.S. Pat. No. 9,131,536), and which claims the benefit of U.S. Provisional Patent Application No. 61/442,369, filed on Feb. 14, 2011, the entireties of which are incorporated by reference herein.

FIELD

The present invention relates generally to the field of equipment for cooking and more particularly to an induction cooking apparatus and a method of induction cooking.

BACKGROUND

Induction cooking is similar to other forms of cooking in that it uses a heated cooking vessel such as a pot or a pan to transfer heat to the food contained in the vessel. Induction cooking differs in that the vessel itself is the source of the heat, receiving its energy through electro magnetic radiation which creates the heat in the walls of the vessel. The heat then reaches the food, from the vessel walls inward.

To function, the vessel must be made of a ferrous or similar material. Sometimes, an adaptor is used to enable a non ferrous pot or pan to be used. The adaptor then becomes the source of the heat. Adaptors are sometimes called induction discs.

Despite the developments of the prior art there remains a need for an induction cooking apparatus which provides targeted application of heat.

OBJECTS AND SUMMARY

It is an object of the present invention to provide an induction cooking apparatus which provides targeted heating of food enabling elective cooking of different parts of the food.

Another object of the present invention is to provide a method for induction cooking which provides improved heating uniformity.

Another object of the present invention is to provide an induction cooking apparatus which incorporates pieces of metal of varying sizes and shapes which are distributed within the cooking vessel to vary the heating pattern.

Another object of the present invention is to provide an induction cooking apparatus in which inserts are inserted into food for the purpose of heating and cooking the food.

Yet another object of the present invention is to provide an induction cooking apparatus to incorporate a relatively small of number of component parts which can be manufactured economically in volume, resulting in a low unit cost.

These and other objects and advantages of the present invention will become evident hereinafter.

In accordance with the present invention, an induction cooking apparatus includes a cooking vessel, a support structure, and a plurality of ferrous elements which are placed throughout the interior of the cooking vessel and are typically mounted on the support structure so that the source of heat is dispersed and distributed enabling a previously unavailable level of heat precision and control in the preparation of food.

Ferrous and similar pieces of metal of varying shapes, sizes, number, and magnetic/conducting properties are distributed throughout the vessel. Each becomes a source of heat so that the food is cooked according to the specifications of the preparer. No longer does the heat travel only from the enveloping heated vessel, (or from the flame which is directed at the food). The heat can travel from a number of separate sources, from inside the cooking vessel, therefore enabling a new level of uniformity—or differentiation—as the case (and desire) may be.

BRIEF DESCRIPTION OF DRAWINGS

Additional features and advantages of the present invention will be made clear in the following specification taken with the drawings in which.

DETAILED DESCRIPTION

Figure 1:
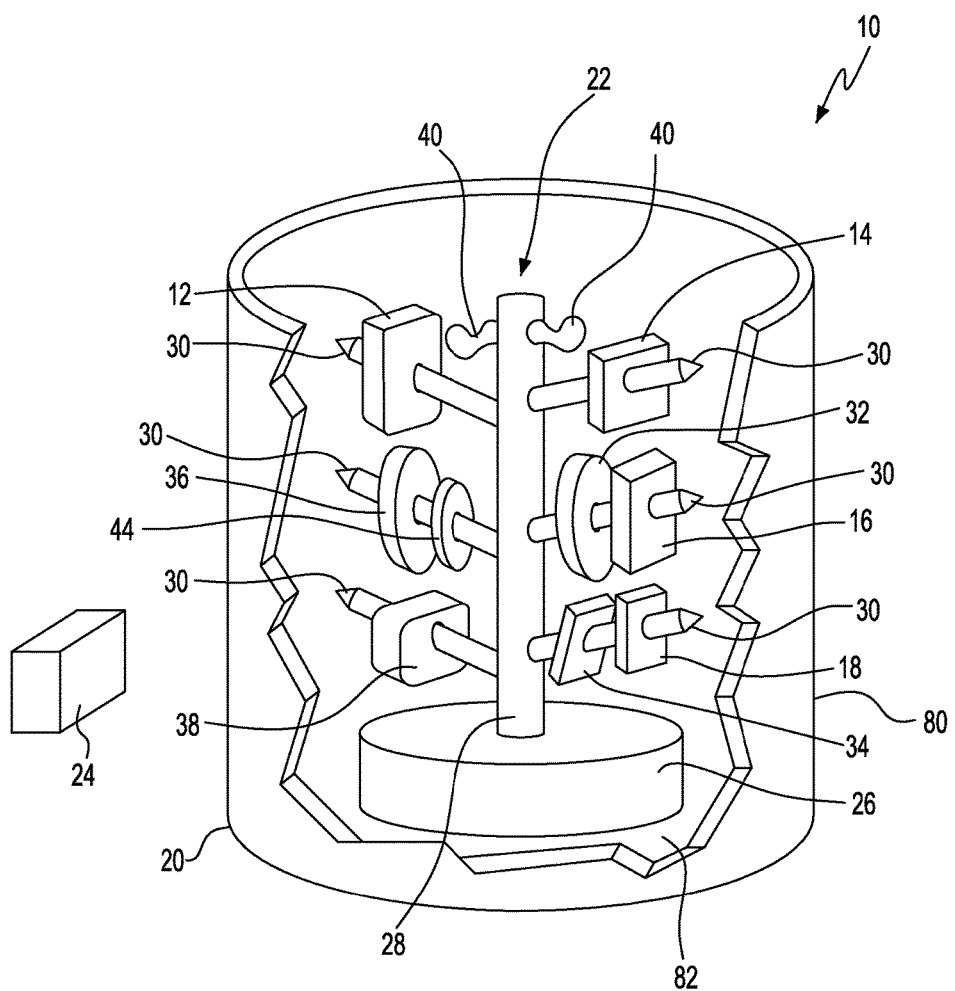
FIG. 1 is an overall perspective view of the induction cooking apparatus according to the present invention with the apparatus shown in use and with a portion of the apparatus shown broken away to reveal details of internal construction.

With reference to the drawings there is shown in FIGS. 1-5 an induction cooking apparatus 10 made in accordance with the present invention, with the apparatus 10 shown in use cooking food items 12, 14, 16, 18. The apparatus 10 includes a cooking vessel 20, a support structure 22 and a source of electro-magnetic radiation 24. The source of electro-magnetic radiation 24 is of conventional construction which is well known in the art and, accordingly, the source of electro-magnetic radiation 24 is represented schematically in FIG. 1 by a rectangular prism. The source of electro-magnetic radiation 24 is capable of producing radiation in a range of power levels and a range of frequencies.

The cooking vessel 20 is a container of generally conventional design and may be made of a non-ferrous material. or, alternatively, of a non ferrous material with a ferrous bottom surface to facilitate two modes of cooking. Induction cooking is accomplished according to the present invention and also conventional cooking may be accomplished using a conventional stove or cook top. As shown in FIG. 1, the cooking vessel 20 has a generally cylindrical side wall 80 and a generally flat bottom 82. The side wall 80 is made of a non ferrous material and the flat bottom 82 may be either a ferrous or non ferrous material.

The source of electromagnetic radiation 24 may be spaced apart from the container 20 as is shown in FIG. 1 or alternatively it may be attached to the generally cylindrical side wall of the container. A plurality of sources of electro-magnetic radiation may 24 be utilized.

The support structure 22 is a key element of the present invention and is preferably made of a non-ferrous material which is capable of withstanding typical cooking temperatures. Appropriate materials for the support structure 22 have been found to be glass, aluminum and certain woods.

Figure 2:
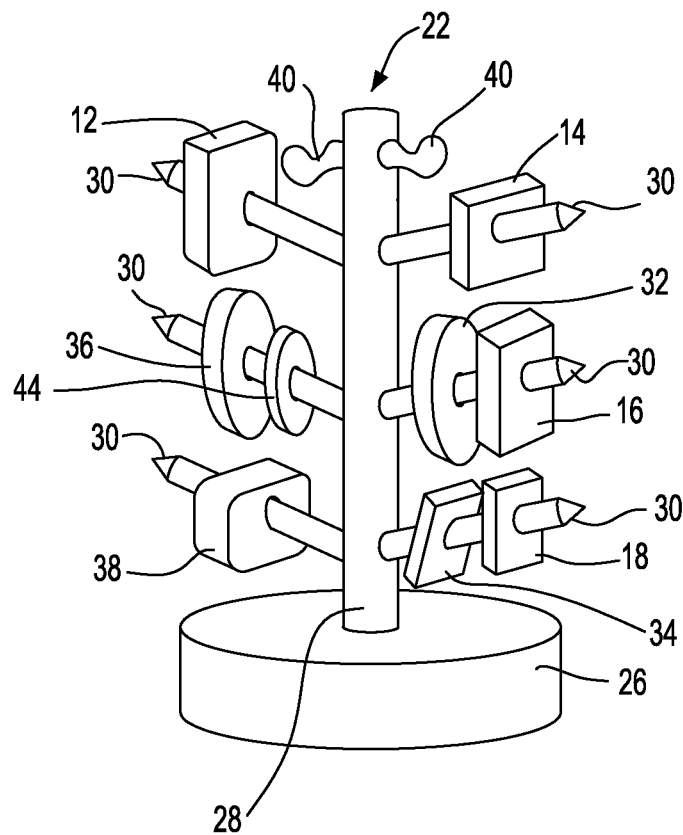
FIG. 2 is a perspective view of the support structure shown in FIG. 1 with the support structure shown removed from the cooking vessel.

As is best shown in FIGS. 1 and 2, the support structure 22 includes a base 26 and a central column 28 which projects upwardly from the base 26.

Along the central column 28 there is a plurality of branches 30 or hooks 40 on which ferrous elements 32, 34, 36, 38 or similar materials may be removably affixed according to the wishes of the person preparing the food. The food being cooked may be affixed to selected branches 30 by allowing the end of the branch 30 to pierce the solid food.

Figure 4:
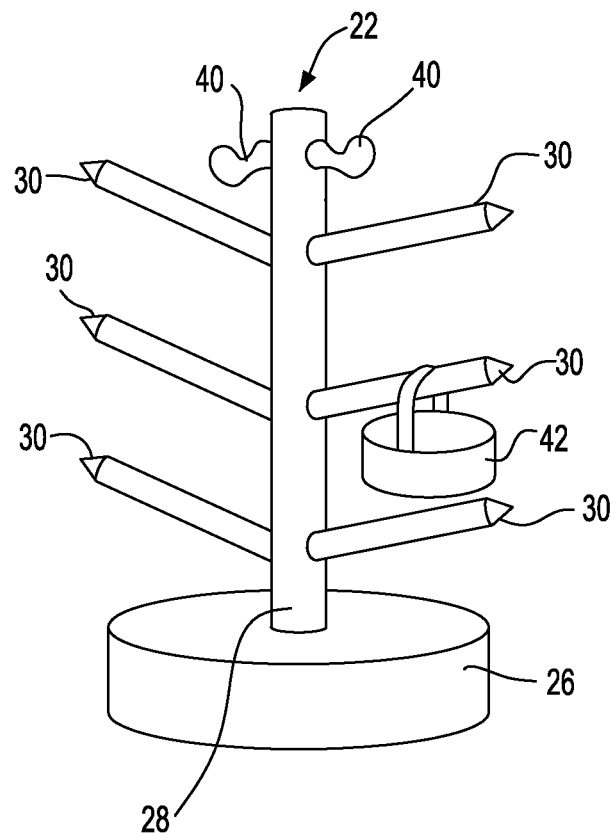
FIG. 4 shows a pail mounted on the support structure.

A ferrous or non-ferrous dish or pail 42 may be hung from a selected branch as shown in FIG. 4. Food of a loose or soft or liquid consistency may be placed in the pail 42 for the purpose of cooking.

During use, the ferrous elements 32, 34, 36, 38, which are hung from selected branches 30 of the support structure 22, are heated by induction in order to create the desired heating pattern. The ferrous elements 32, 34, 36, 38 may be of various shapes and number according to the cooking application. Included in these shapes are rectangular, circular, ellipsoidal, triangular and regular and irregular geometrical shapes. The size of the ferrous elements 32, 34, 36, 38 and the relative proximity of the ferrous elements 32, 34, 36, 38 to the food being cooked may be adjusted or varied by a user in order to create a desired heating pattern.

Figure 3:
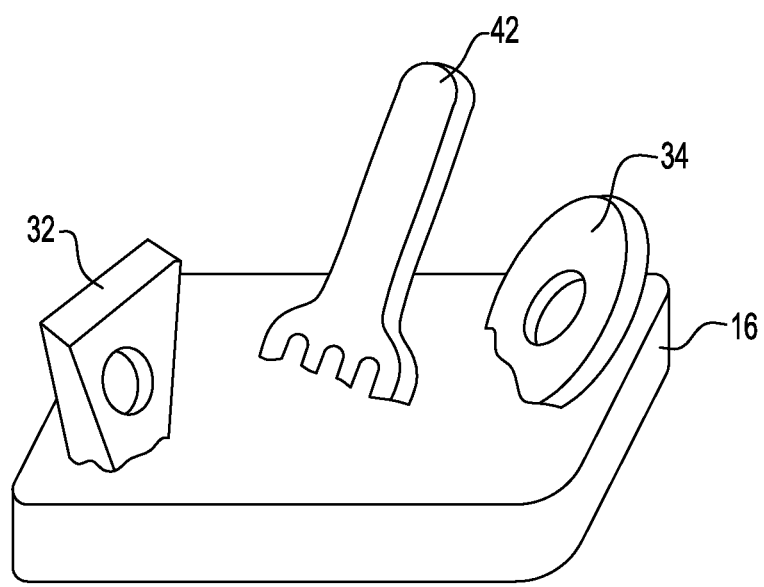
FIG. 3 is an alternative embodiment of the invention in which ferrous elements are inserted directly into food.

The ferrous element may also have various configurations including a household item such as an eating utensil 42 as is shown in FIG. 3.

During use, the source of electro-magnetic energy 24 creates heat within the ferrous elements 32, 34, 36, 38.

When a ferrous cooking vessel is used the electro-magnetic radiation source can also create heat in the cooking vessel 20.

The ability to vary the size, shape and proximity of the ferrous elements 32, 34, 36, 38 to the food being cooked results in a previously unavailable level of precision and control in the preparation of food.

In another embodiment shown in FIG. 3, solid foods for which structures and hanging ferrous elements are unsuitable, elements 32, 34, 42 are provided with sharp edges which can be stuck into the food at various places—or inserted into folds at specified locations. The heating (and cooking) will be precise, and once the process is over, the elements 32, 34, 42 are readily removed.

Figure 5:
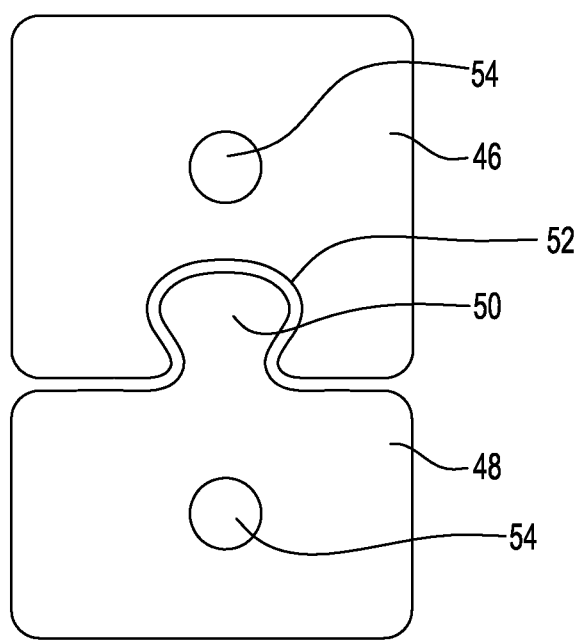
FIG. 5 shows a pair of ferrous elements joined together.

The ferrous elements can have different sizes, shapes compositions and magnetic properties. The ferrous element may be connected one to another either by mounting two or more ferrous elements 36, 44 on a single branch of the support structure as shown in FIG. 4 or alternatively providing a snap together or link together interface as shown in FIG. 5. Ferrous elements 46, 48 can be easily attached and detached as is shown in FIG. 5 ferrous element 48 includes a projecting tongue 50 while ferrous element 46 includes a receptacle 52 which accepts the tongue 50. Ferrous elements 46, 48 include apertures 54 for attachment to a branch 30.

The ability to vary the number, shape orientation and proximity to the food during the cooking process enables the user to achieve a previously unobtainable level of control and precision in the preparation of food.

The present invention also includes an induction cooking oven which is generally similar to the cooking vessel 20 and which is generally rectangular and box-like in configuration having a top, a bottom and four side walls with food disposed on ferrous or non ferrous racks mounted within the oven. Ferrous elements 32 34, 42 are inserted into the food as previously described. A plurality of sources of electro magnetic radiation 24 are disposed on the top wall and the four sidewalls.

The present invention provides a method for induction cooking which includes the following steps:

1. Placing a plurality of ferrous elements in proximity to food;
2. Subjecting the ferrous element and the food to electro-magnetic radiation, thereby enabling the electro-magnetic energy to heat the ferrous elements and allowing the heated ferrous element to transfer heat to the food.

In addition, the present invention provides another method for induction cooking which includes the following steps:

1. Inserting at least one ferrous element into food;
2. Subjecting the ferrous element and the food to electro-magnetic radiation thereby enabling the electro-magnetic energy to heat the at least one ferrous element by induction and allowing the heated ferrous element to transfer heat to the food.

The foregoing specific embodiments of the present invention as set forth in the specifications herein are for illustrative purposes only. Various deviations and modification may be made within the spirit and scope of this invention, without departing from a main theme thereof.

What is claimed is:

1. A method comprising:
   mounting one or more ferrous members to a support structure in a non-ferrous vessel, wherein the support structure comprises a base, a central column projecting from the base, and a plurality of extension members configured to receive the one or more ferrous members;
   placing an object proximate to the one or more ferrous members; and
   activating an electromagnetic radiation source for heating the one or more ferrous members such that the one or more ferrous members deliver heat to the object.

2. The method of claim 1, wherein the plurality of extension members comprises one or more hooks on the central column, and wherein the one or more ferrous members are configured to be removably mounted to the one or more hooks.

3. The method of claim 2, wherein the plurality of extension members further comprises one or more branches extending from the central column, and wherein the one or more ferrous members are configured to be removably mounted to the one or more branches.

4. The method of claim 1, further comprising mounting the object to one or more of the plurality of extension members.

5. The method of claim 1, further comprising varying at least one of a size and shape of at least one of the one or more ferrous members for adjusting a heating pattern for heating the object.

6. The method of claim 1, further comprising interlocking at least two of the one or more ferrous members for forming a larger ferrous member.

7. The method of claim 1, wherein at least one of the one or more ferrous members comprises a container for mounting to the plurality of extension members.

8. The method of claim 7, wherein placing the object proximate to the one or more ferrous members comprises placing the object in the container.

9. The method of claim 1, further comprising:
   mounting a container on the plurality of extension members, wherein the container comprises a non-ferrous material; and
   placing the one or more ferrous elements within the container.

10. The method of claim 1, further comprising inserting an insertable ferrous member into the object such that the insertable ferrous member heats the object from within.

11. The method of claim 1, wherein the object comprises food.

12. An induction apparatus comprising:
a vessel, wherein at least a portion of the vessel is non-ferrous;
a support structure in the vessel comprising:
a base;
a central column projecting from the base; and
a plurality of extension members projecting from the central column;
one or more ferrous members configured to be removably mounted to one or more of the plurality of extension members of the support structure; and
an electromagnetic radiation source configured to heat the one or more ferrous members;
wherein the vessel comprises a side wall and a bottom surface to define an interior of the vessel, wherein the support structure extends from the base into the interior of the vessel, and wherein the base is on the bottom surface of the vessel, and wherein a top of the vessel is open.

13. The induction cooking apparatus of claim 12, wherein the plurality of extension members comprises hooks extending from the central column.

14. The induction cooking apparatus of claim 13, wherein the plurality of extension members further comprises branches extending from the central column.

15. The induction cooking apparatus of claim 12, wherein the side wall comprises a non-ferrous material.

16. The induction cooking apparatus of claim 12, wherein the bottom surface comprises a ferrous material.

17. The induction cooking apparatus of claim 12, wherein the bottom surface comprises a non-ferrous material.

18. A method comprising:
mounting one or more ferrous members to a support structure in a non-ferrous vessel, wherein the support structure comprises a base, a central column projecting from the base, and a plurality of extension members configured to receive the one or more ferrous members;
mounting an object to one or more of the plurality of extension members;
adjusting at least one of a size, shape, and proximity of the one or more ferrous members relative to the object to obtain a heating pattern; and
applying electromagnetic radiation to the one or more ferrous members to heat the object in accordance with the heating pattern.

19. The method of claim 18, further comprising activating an electromagnetic radiation source proximate to the vessel for heating the one or more ferrous elements via the electromagnetic radiation.

20. The method of claim 18, wherein the plurality of extension members comprises hooks and branches extending from the central column.

* * * * *